United States Patent

Potjer et al.

[11] Patent Number: 5,851,566
[45] Date of Patent: Dec. 22, 1998

[54] APPLICATOR DIE

[75] Inventors: Bert Potjer, HD Voorschoten, Netherlands; Luigi Sartor, Pasadena, Calif.; Robert Lindsay Druschel, Eau Claire, Wis.

[73] Assignee: Avery Dennison, Pasadena, Calif.

[21] Appl. No.: 676,522

[22] Filed: Jul. 2, 1996

[51] Int. Cl.$^6$ .................................................. B28B 13/00
[52] U.S. Cl. ......................... 425/225; 425/132; 425/155; 425/382.4; 425/462; 264/176.1
[58] Field of Search ..................... 425/132, 155, 425/225, 226, 227, 382.4, 462; 264/176.1

[56] References Cited

U.S. PATENT DOCUMENTS

| | | |
|---|---|---|
| 3,480,998 | 12/1969 | Erdberg . |
| 3,595,204 | 7/1971 | McIntyre et al. . |
| 3,680,997 | 8/1972 | Dukert et al. . |
| 3,694,119 | 9/1972 | Scheibling ........................ 425/382.4 X |
| 3,708,253 | 1/1973 | Lemelson ................................ 425/155 |
| 3,769,232 | 10/1973 | Houldridge .......................... 425/155 X |
| 3,797,987 | 3/1974 | Marion . |
| 3,829,274 | 8/1974 | MeLead . |
| 3,832,120 | 8/1974 | Shaffer . |
| 3,941,551 | 3/1976 | Marion . |
| 4,152,387 | 5/1979 | Cloeren . |
| 4,197,069 | 4/1980 | Cloeren . |
| 4,334,637 | 6/1982 | Baker et al. . |
| 4,465,212 | 8/1984 | Boone . |
| 4,472,129 | 9/1984 | Siard ............................... 425/382.4 X |
| 4,476,165 | 10/1984 | McIntyre . |
| 4,533,308 | 8/1985 | Cloeren . |
| 4,565,217 | 1/1986 | McIntye . |
| 4,619,802 | 10/1986 | Cloeren . |
| 4,725,468 | 2/1988 | McIntyre . |
| 4,756,271 | 7/1988 | Maier . |
| 4,783,290 | 11/1988 | Simelunas ........................... 425/225 X |
| 4,821,576 | 4/1989 | Miura et al. ........................ 425/225 X |
| 4,891,249 | 1/1990 | McIntyre . |
| 4,907,741 | 3/1990 | McIntyre . |
| 4,996,091 | 2/1991 | McIntyre . |
| 5,020,984 | 6/1991 | Cloeren et al. . |
| 5,066,435 | 11/1991 | Lorenz et al. ................... 425/382.4 X |
| 5,079,066 | 1/1992 | Leseman et al. . |
| 5,080,957 | 1/1992 | Leseman et al. . |
| 5,108,683 | 4/1992 | Anand ................................. 425/462 X |
| 5,115,972 | 5/1992 | Maier et al. . |
| 5,120,484 | 6/1992 | Cloeren . |
| 5,145,544 | 9/1992 | Leseman et al. . |
| 5,147,190 | 9/1992 | Hovarter . |
| 5,147,195 | 9/1992 | Cloeren ............................. 425/462 X |
| 5,173,141 | 12/1992 | Leseman et al. . |
| 5,207,970 | 5/1993 | Joseph et al. . |
| 5,208,047 | 5/1993 | Cloeren et al. . |
| 5,284,430 | 2/1994 | Tomic et al. ..................... 425/382.4 X |

FOREIGN PATENT DOCUMENTS

WO 93/07228  4/1993  WIPO .

Primary Examiner—David A. Simmons
Assistant Examiner—Paul M. Rivard
Attorney, Agent, or Firm—Calfee, Halter & Griswold LLP

[57] ABSTRACT

An improved applicator die for alternately depositing different liquid coating materials on a moving web comprises a die body having switch bars for opening and closing respective flow passageways for supplying the different liquid coating materials to an elongated coating orifice from respective manifolds. The switch bars, flow passageways and manifolds are substantially as wide as and substantially parallel to the coating orifice of the die whereby changeover between different coating materials can be made very rapidly.

25 Claims, 4 Drawing Sheets

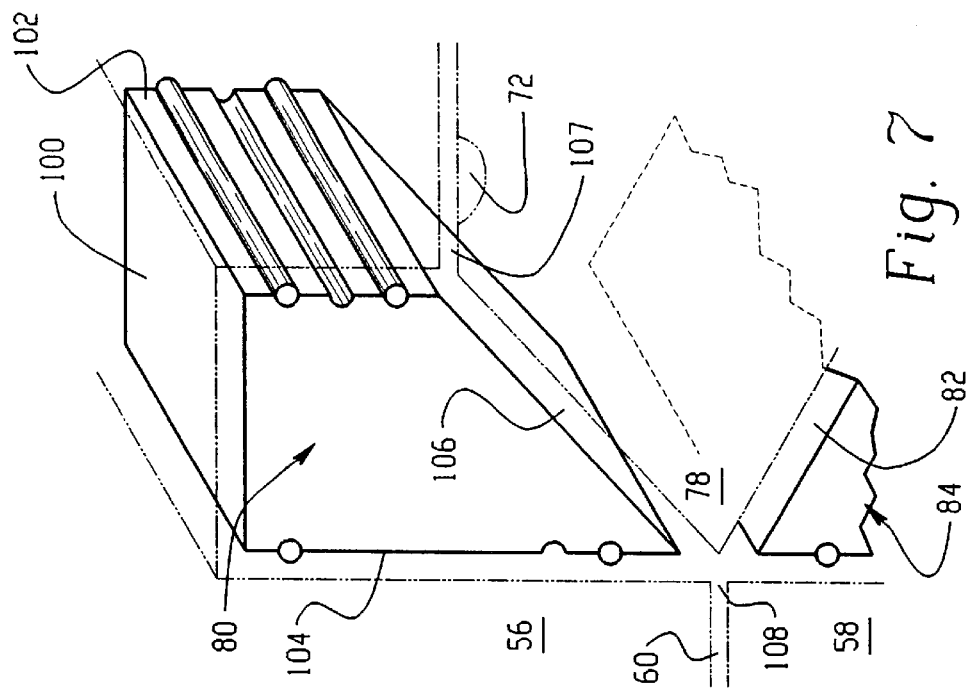
Fig. 7
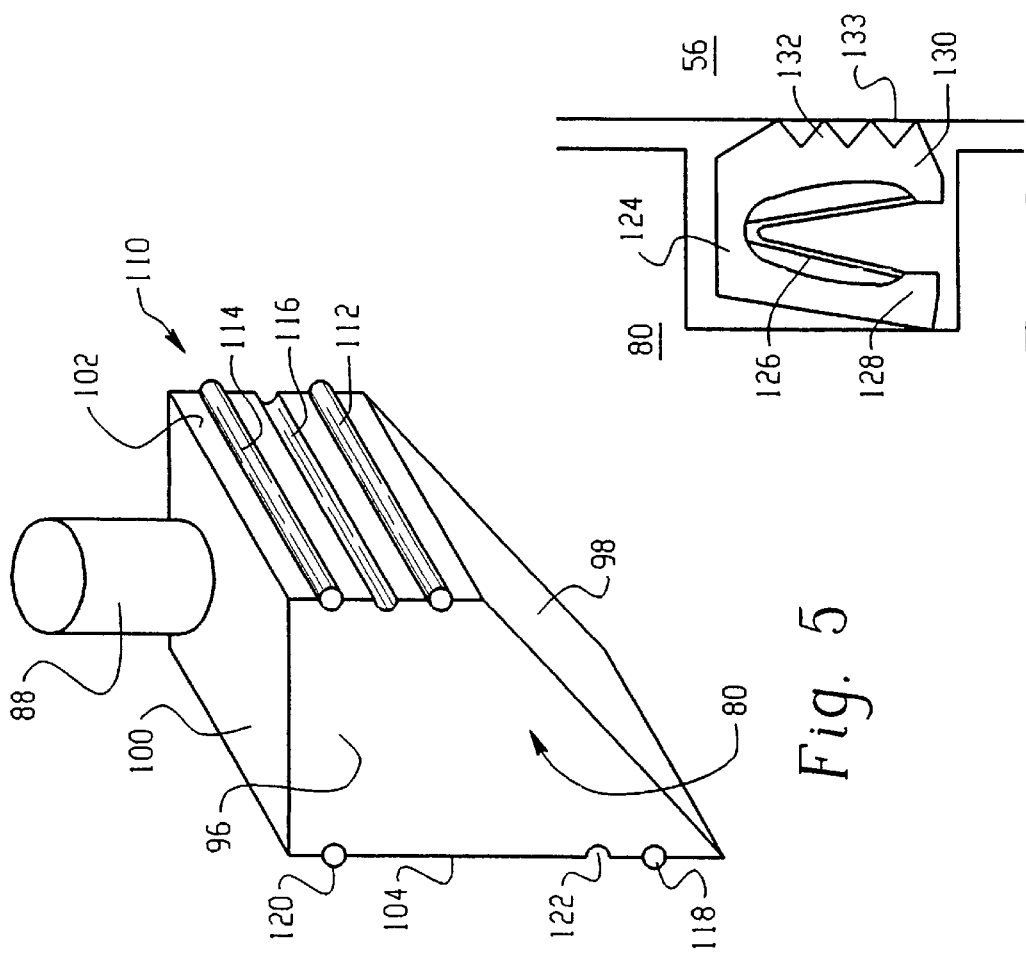
Fig. 6
Fig. 5

APPLICATOR DIE

BACKGROUND OF THE INVENTION

The present invention relates to an improved applicator die for applying a liquid coating such as a pressure sensitive adhesive to a moving sheet or web.

Pressure sensitive labels typically consist of a backing paper or film, a thin layer of a release material typically made from silicones, a layer of pressure sensitive adhesive and a front layer of paper or plastic, typically referred to as a "facestock."

Pressure sensitive labels are typically made from long, continuous rolls of label stock which are printed or otherwise marked with desired indicia and then separated into individual labels.

Conventional processes for manufacturing continuous webs of pressure sensitive labeling stock typically take the form illustrated in FIG. 1. As shown in this figure, a continuous sheet or web of backing paper 10 is continuously unwound from paper roll 12, passed through backing imprint station 14, through silicone coating station 16 and into curing oven 18 where the silicone release layer is dried and cured. In some systems, imprint station 14 follows silicone coating station 16. Then, the web is passed into coating station 20 where a thin layer of pressure sensitive adhesive is applied to the silicone layer. The web is then passed into a drying oven 24 where the pressure sensitive adhesive is dried to a tacky state. Alternatively, the pressure sensitive adhesive is solidified by cooling as, for example, when a hot melt adhesive is used. After passing out of drying oven 24, the web is passed to lamination station 26 where the web is laminated with a layer of facestock 28 continuously withdrawn from facestock supply 30. The completed web is then wound up at product roll 31.

In order to apply the pressure sensitive adhesive to web 10 at coating station 20, an applicator die such as schematically illustrated in FIG. 2 is typically used. As shown in this Figure, web 10 is passed over a backup roll 22 such that the silicone layer on web 10 faces applicator die 34. Applicator die 34 includes a coating orifice 36 arranged approximately perpendicular to the direction of travel of web 10, with the width of coating orifice 36 being approximately as wide as the width of web 10. In this context, "width" refers to the dimension taken transverse to the direction of travel of the web passed the die coating orifice. Pressure sensitive adhesive is supplied to coating orifice 36 from an inlet orifice 38 which communicates with a manifold 40 for distributing pressure sensitive adhesive along the entire width of coating orifice 36. Manifold 40 communicates with coating orifice 36 through an elongated, narrow slot or "preland" 44 and then through an even narrower elongated slot or "land" 48.

In applicator dies of the type described above, manifold 40, preland 44 and land 48 are typically arranged substantially parallel to and substantially as wide as the coating orifices of the dies. Preland 44 is also typically quite long (i.e. the dimension corresponding to the direction of flow of coating material) relative to its thickness. For example, the length/thickness ratios in such prelands are typically between about 25/1 and 50/1, while the length/thickness ratios in lands are typically between about 50/1 and 100/1. In the die illustrated in FIGS. 1 and 2, preland 44 is approximately 750 $\mu$m thick and 1 inch long, while land 48 is approximately 100 to 200 $\mu$m thick and 0.75 inches long.

Manifolds, prelands and lands arranged substantially parallel to and substantially as wide as their corresponding coating orifices are widely used in applicator dies as they facilitate uniform delivery of liquid coating material across the entire width of the web to be coated. Also, lands are typically adjustable so that the thickness of coating applied can be adjusted as desired.

Conventional manufacturing processes such as illustrated in FIGS. 1 and 2 can operate at a wide range of production speeds. For example, it is not uncommon for commercial embodiments of the above arrangement to operate at rates from 50 to 500 meters per minute using webs having widths of one meter or more. In addition, many different pressure sensitive adhesives can be used in such processes for manufacturing pressure sensitive labels. For example, hot melt adhesives, solvent-based adhesives and emulsion-based adhesives can be used for this purpose. Also, within each of these categories, many different compositions can be employed. Furthermore, a wide variety of different liquid coatings, in addition to pressure sensitive adhesives, can be applied to moving webs using applicator dies and techniques as described above.

In commercial operation, it is often necessary to switch from one pressure sensitive adhesive to another in order to meet customer demands and other performance requirements. Currently, this is done by switching from the previously used pressure sensitive adhesive to a new pressure sensitive adhesive upstream of the inlet orifice of the die. Also, the die is typically shut down and sometimes cleaned by passing a suitable cleaning liquid such as soapy water through the die before the new adhesive is fed therethrough. In some instances, an operator passes a shim or other implement through the coating orifice to ensure that no adhesive is lodged therein.

Because of the relatively large mass of web roll 10 and the need to keep web 10 moving at constant speed in commercial operation, it is customary to keep web 10 moving during the two to three minutes typically required for changeover from one pressure sensitive adhesive to another. Since the web produced during the changeover period will typically have an off-specification amount of pressure sensitive adhesive or no pressure sensitive adhesive at all, it is customary to discharge all of this material to waste each time a changeover is made. At production rates typically encountered today, this translates to a loss of 100 to 1,000 or more meters of product for each changeover.

Accordingly, there is a need for a new applicator die which will allow a much more rapid changeover between pressure sensitive adhesives than possible in conventional practice.

In this regard, applicator dies which are capable of processing two or more pressure sensitive adhesives at the same time are already known. See, for example, U.S. Pat. No. 3,480,998 to Von Erdberg and U.S. Pat. No. 4,152,387 to Cloeren. However, these dies are made for continuously producing multi layer coatings, not for alternately producing single layer coatings. Therefore, they are not capable of completely eliminating the flow of one layer or the rapid changeover that is necessary to reduce or eliminate the large amount of waste produced under current practice.

U.S. Pat. No. 4,756,271 to Gary Maier discloses an applicator die which does allow changeover from one pressure sensitive adhesive to another for alternately producing single-layer coatings. However, in dies of this type, sealing of dies to prevent leakage of one pressure sensitive adhesive into the other can be a problem.

Leakage of one pressure-sensitive adhesive into the other in a die capable of processing multiple adhesives can lead to off-specification product. Also, pressure sensitive adhesives can become trapped in "dead zones" in the die where they can harden, thereby making the die inoperative. This problem is exacerbated with dies such as illustrated in the Maier patent in which one or more flow channels are shut down for extended periods of time.

The die shown in the above-noted Maier patent uses a rotary cam to effect changeover between different adhesives. During this changeover, the face or leading edge of the cam slides over the outlet channel leading to the coating orifice. With the design, effective sealing can be difficult, as any sealing means provided on the leading edge of the cam is constantly abraded as the cam is moved between different coating positions.

Accordingly, there is need for a die which not only allows rapid changeover from one adhesive to another but which also is capable of operating over extended periods of time with little or no leakage.

SUMMARY OF THE INVENTION

In accordance with the present invention, an improved applicator die is provided which includes two manifolds for receiving two different coating liquids such as pressure sensitive adhesives, two separate passageways communicating between respective manifolds and the die pre-land, and a closure means for opening and closing the two different passageways to allow the coating liquid in two manifolds to alternatively flow into the die pre-land and coating orifice. Each of the manifolds in the die and each of the respective flow passageways communicating with the die pre-land are arranged essentially parallel to and at essentially the same width as the coating orifice. In addition, the closure means is adapted to open and close each flow passageway by a snap-action. In addition, a sealing system is provided for sealing the closure means in the die body of the inventive die to prevent leakage of the two coating liquids.

Because the manifolds and associated flow passageways of the inventive applicator die are parallel to and as wide as the coating orifice, each of the coating liquids is delivered to the coating orifice as uniformly as possible along the entire length of the coating orifice. In addition, because the closure means opening and closing the respective flow passageways operates with a snap action, switchover between adhesives occurs very rapidly, thereby minimizing the production of off-specification product. Furthermore, because the closure means is mounted in the die body of the inventive applicator die with a sealing system, leakage of the two coating liquids into one another inside the die, and leakage of the coating liquids outside of the die, is substantially eliminated.

As a result of these features, it is possible with the inventive applicator die to switch over from one coating liquid to another in time periods as short as 0.1 to 1.0 second. This translates to production of off-specification product of typically one to three meters rather than 100 to 1,000 meters as encountered in current practice. Moreover, because leakage of the coating liquids is essentially eliminated, the inventive applicator die can operate for very long periods of time with little or no maintenance or shut down. This further contributes to improved production rates and lower waste production.

BRIEF DESCRIPTION OF THE DRAWINGS

The present invention may be more readily understood by reference to the following drawings wherein:

FIG. 5 is a partial schematic perspective view of a switch bar or closure means used in the applicator die of FIGS. 3 and 4; and FIG. 6 is a schematic end view illustrating the structure of the preferred sealing means used for sealing the switch bar of FIG. 5 in the die body of the improved applicator die of FIG. 3; and FIG. 7 is another schematic perspective view illustrating the relationship of the switch bar of FIG. 5 with the other elements of the improved die of FIGS. 3, 4 and 5.

DETAILED DESCRIPTION

Figure 1:
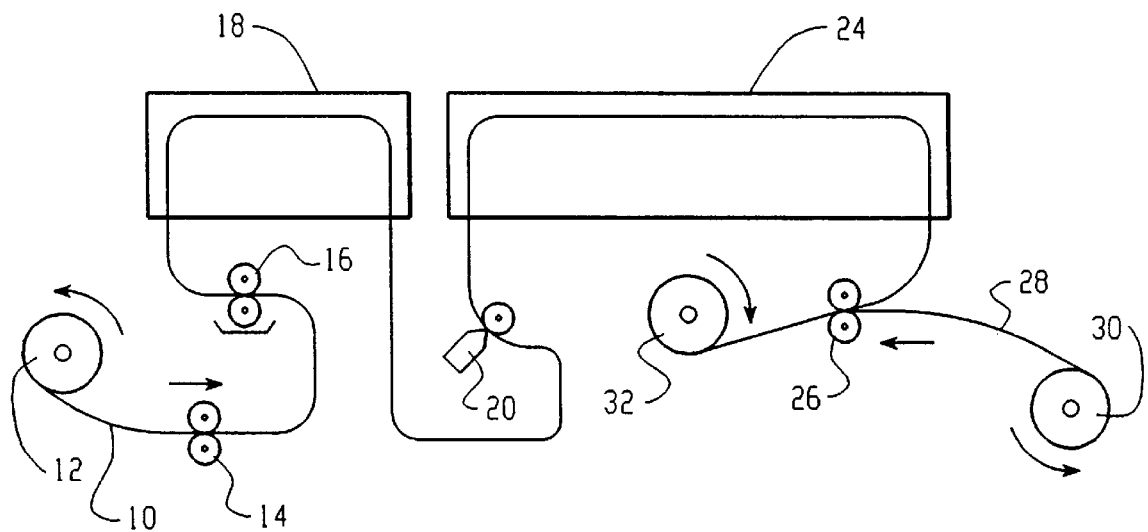
FIG. 1 is a schematic illustration of a typical prior art setup for manufacturing label stock.
Figure 2:
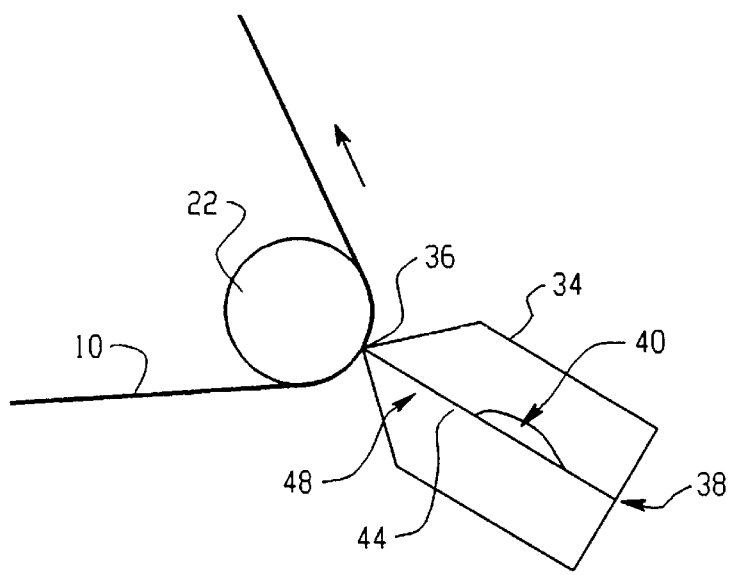
FIG. 2 is a schematic illustration of a prior art applicator die used in the setup of FIG. 1.
Figure 3:
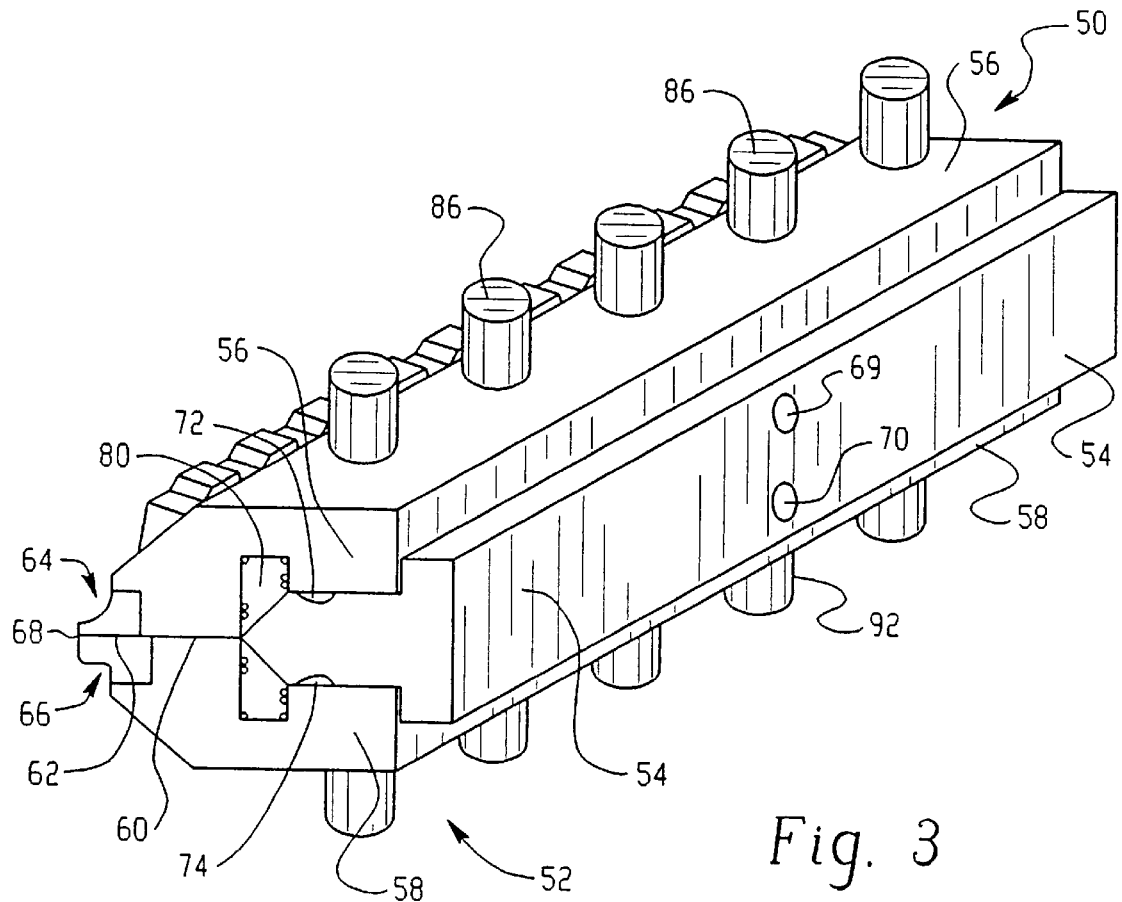
FIG. 3 is a schematic illustration of the improved applicator die of the present invention.
Figure 4:
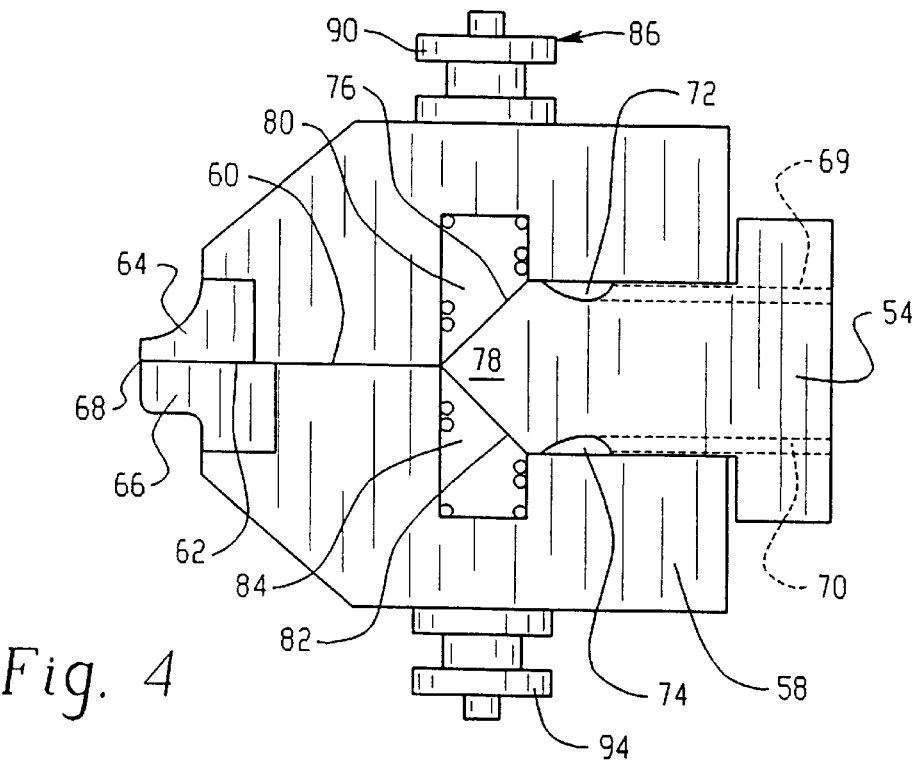
FIG. 4 is an end view of the improved applicator die of FIG. 3.
Figure 8:
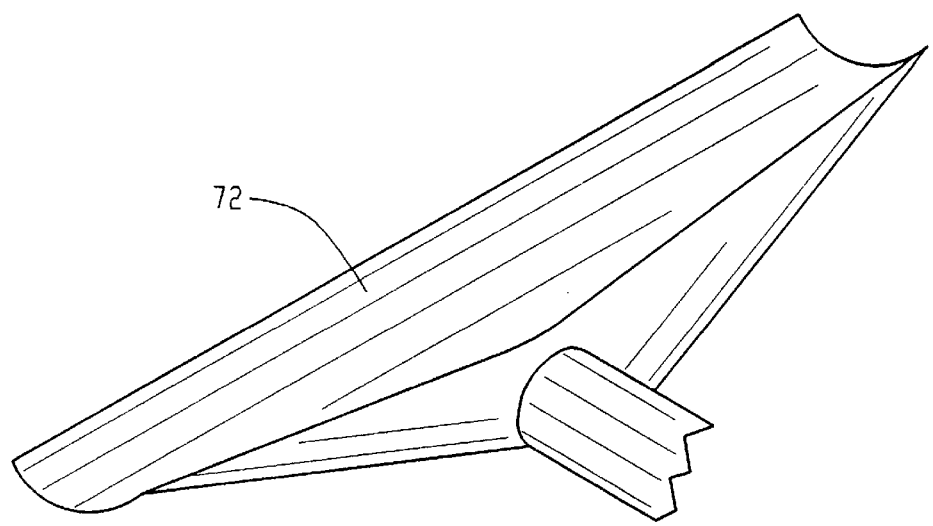
FIG. 8 is a schematic perspective view illustrating the shape of the manifolds of the improved applicator die of FIG. 3.

As shown in FIG. 3, the inventive applicator die generally indicated at 50 is composed of an elongated die body 52 having a width generally as wide as the width of the moving web to be coated. Die body 52 is composed of a center section 54, a top section 56 and a bottom section 58. Top section 56 and bottom section 58 define therebetween an elongated, narrow slot or preland 60. Preland 60 communicates with land 62 defined between upper die lip 64 and lower die lip 66.

The outer edges of upper die lip 64 and lower die lip 66 define a coating orifice 68 from which liquid material is deposited from die 50 onto a moving web to be coated. In accordance with conventional practice, upper die lip 64 and lower die lip 66 can be adjustable so that the thickness of land 62, and hence the amount of liquid material deposited on the moving web through coating orifice 68, can be adjusted as desired. Alternatively, one or both die lips can be fixed, if desired.

In order to alternately supply first and second liquid coating materials to coating orifice 68, first inlet orifice 69 and second inlet orifice 70 are defined in center section 54 of die body 52. First inlet orifice 69 communicates with a first manifold 72 which is defined by an elongated groove in center section 54 of die body 52. In the same way, second inlet orifice 70 communicates with second manifold 74, which is also defined by an elongated slot or channel in center section 54 of die body 52. Each of manifolds 72 and 74 is substantially parallel to and substantially the same width as coating orifice 68. In addition, each of manifolds 72 and 74 can be defined in top and bottom sections 56 and 58 of the die rather than in center section 54, if desired.

In order to charge liquid coating material in manifold 72 into preland 60, a first liquid passageway or switch preland 76 is provided. First liquid passageway 76 is defined by two congruent surfaces one of which defined by a leading end 78 of die center section 54 and the other of which is defined by a closure means or closure element, which in the particular embodiment shown is composed of a first switch bar 80. In the same way, second manifold 74 communicates with preland 60 by means of second liquid passageway or switch preland 82, with second liquid passageway or switch preland 82 also being defined by two congruent surfaces, one of which is formed in the leading end 78 of die central section 54 and the other of which is defined by second switch bar 84. First and second liquid passageways 76 and 82 as well as corresponding switch bars 80 and 84, like manifolds 72 and 74, are also substantially parallel to and substantially as wide as coating orifice 68.

A first actuator 86 includes a piston rod 88 (FIG. 5) integrally attached to first switch bar 80 and a force generator 90 for generating a magnetic, pneumatic or hydraulic force on piston rod 88. A mechanical actuator such as an asymmetric cam can also be used for this purpose. Force generator 90 is of the dual action variety and thereby is capable of moving switch bar 80 up or down in die upper body section 56 for opening and closing first liquid passageway 76. In the same way, a second actuator 92 includes a piston rod (not shown) and a force generator 94 for moving second switch bar 84 between open and closed positions for allowing and preventing flow of liquid coating material through second liquid passageway 82.

In normal operation, one of switch bars 80 and 84 is in an open position while the other is in a closed position. Therefore, only one of the liquid coating materials supplied from inlet orifice 69 and 70 will flow into preland 60, land 62 and coating orifice 68 at any one time. In addition, changeover from one to the other liquid coating material can be made extremely rapidly by reversing the positions of the two switch bars via actuators 86 and 92. In other words, liquid passageways 76 and 82 are adapted to snap open and snap closed due to the short distance of travel of switch bars 80 and 84 as well as the rapid movement of these switch bars made possible by force generators 90 and 94. Thus, for example, in a die in which liquid passageways 76 and 82 are 500 to 5,000 μm thick, changeover can occur in as little as 0.01 to 1.0 second.

FIG. 5 illustrates the structure of switch bars 80 and 84 in more detail. As shown in this figure, switch bar 80 is composed of a rigid body member 96 having a leading end 98 and a trailing end 100. Leading end 98 is composed of a flat, angled surface which, together with leading end 78 of die center section 54, defines first liquid passageway 76. In addition, rigid body member 96 defines an upstream side surface 102 and a downstream side surface 104, both of which are parallel to one another as well as being parallel to piston 88. With this structure, switch bar 80 slidably moves in die upper section 56 in response to actuation of actuator 86.

The relationship of switch bar 80 with respect to the other elements of die 50 is further illustrated in FIG. 7, it being understood that the relationship of switch bar 84 to the other corresponding elements in the die is the same. As shown in FIG. 7, switch bar 80 is mounted for slidably moving in a direction parallel to side surfaces 102 and 104 for opening and closing first liquid passageway 76. In addition, the downstream end 106 of liquid passageway 76 terminates at upstream end 108 of preland 60. In addition, first manifold 72 and first liquid passageway 76 are connected to one another by first manifold preland 107, first manifold 72 being closely adjacent first liquid passageway 76. By closely adjacent is meant that first manifold 72 is as close as possible to liquid passageway 76 (i.e. first manifold preland 107 is as short as possible) within reasonable machining tolerances. In other words, manifold 72 is not so close to flow passageway 76 that any off specification machining would cause undue wear on the front end of the manifold, as this would lead to failure of die 50 from wear. Within this constraint, however, manifold 72 is as close as possible to liquid passageway 76. Also, it is desirable that switch bars 80 and 84 and in particular the exit ends of these switch bars, be machined as precisely as possible, as this results in virtually no dead spots being present at the outlet ends of switch bar passageways 76 and 82 into preland 60.

In order to prevent leakage of the liquid materials being processed by inventive applicator die 50, a sealing system generally indicated at 110 is provided. See FIGS. 5, 6 and 7. Sealing system 110 includes a first primary seal 112 and a first secondary seal 114, each of which is defined in upstream side surface 102 of side bar 80. Located between primary and secondary seals 112 and 114 is a fluid seal 116 which is connected to a source of continuously or intermittently supplied cleaning fluid such as water supplied at a lower pressure, e.g. 5 psig, which is continuously discharged to waste or recirculated by outlet ports, not shown. Sealing system 110 further includes a second primary seal 118, a second secondary seal 120 and a second fluid seal 122 all defined in downstream side surface 104 of switch bar 80. As illustrated in FIG. 6, each of the primary and secondary seals takes the form of a strip 124 of material arranged substantially parallel to and substantially as long as coating orifice 68. Each of these seals, in cross section, is preferably composed of a U-shaped member made of a flexible material such as a plastic or elastomer, the U-shaped member carrying an elongated spring member or initially soft polymer cord 126 therein for biasing legs 128 and 130 of U-shaped member 124 in an outward direction. In the embodiment shown, leg 130 includes teeth 132 for engaging the bearing surface 133 of die top portion 56 in which switch bar 80 is slidably received. Sealing system 110 substantially eliminates leakages of liquid coating materials between switch bars 80 and 84 and their associated die body sections. This effectively prevents forced shut down of die 50 through hardening of liquid being coated in these areas, which may occur when pressure sensitive adhesives are used.

As shown in FIGS. 5 and 7, the end surfaces of switch bar 80 are also arranged parallel to piston 88 and, in the embodiment shown, perpendicular to side surfaces 102 and 104 of the switch bar. Upper die section 56 also defines mating surfaces for slidably receiving these switch bar end surfaces, these mating surfaces also being arranged parallel to piston 88. To prevent leakage of liquid coating material between the end surfaces of switch bar 80 and the mating surfaces of upper die body section 56, the same sealing system described above can be used. However, in the preferred embodiment of the invention, these surfaces can be effectively sealed by forming these mating surfaces from a suitable material such as flat sheets of fiber-reinforced Teflon® or a soft metal such as brass or copper.

With the foregoing structure, the inventive applicator die can achieve an extremely rapid changeover from one liquid coating material to the other. This is due, in part, to the fact that switch bars 80 and 84 move by a snap action only a very small distance between open and closed positions.

This is also due, however, to liquid passageways 76 and 82 as well as manifolds 72 and 74 being arranged substantially parallel to and substantially as wide as coating orifice 68. As illustrated in FIGS. 3, 4, 5 and 6, liquid passageways 76 and 82 in effect form "switch prelands" between preland 60 and manifolds 72 and 74, respectively. In addition, manifolds 72 and 74 communicate with liquid passageways 76 and 82 by respective manifold prelands, one of which is illustrated at 107 in FIG. 7. As is well known, prelands and manifolds arranged substantially parallel to and substantially as wide as their associated coating orifices facilitate uniform metering and distribution of coating materials across the entire width of web to be coated. Therefore, forming liquid passageways 76 and 82 of the inventive die as additional "prelands" fosters immediate, uniform flow of coating material upon opening of the associated switch bar. This substantially reduces the time needed for the flow of new coating material to reach steady state operation, and thereby further reduces waste production.

Still another reason why the inventive applicator die can achieve rapid changeover between different coating compositions resides in the close spacing between manifolds 72 and 74, liquid passageways 76 and 82, and preland 60. Because of this close spacing, there is essentially no dead space in which unused coating material can become trapped or remain behind. Accordingly, downtime needed to remove trapped, solidified coating material from the die is essentially eliminated.

Another important feature of the inventive applicator die is that it is relatively maintenance free. This is due primarily through the elimination of leakage, which in turn is due to the adoption of a number of different design features as described above. For example, the close spacing of the manifolds and preland to flow passageways 76 and 82 reduces dead spaces for entrapment of liquid coating material. In addition, sealing system 110, as well as the end face sealing system described above, substantially prevent liquid coating material from becoming entrapped between the side and end surfaces of the switch bars and the mating surfaces of the associated die body sections in which they are housed. Together, these features allow applicator die 50 to operate in an essentially trouble free manner for extended periods of time, while at the same time allowing extremely rapid changeover between different coating liquids in a simple and easy manner.

Figure 9:
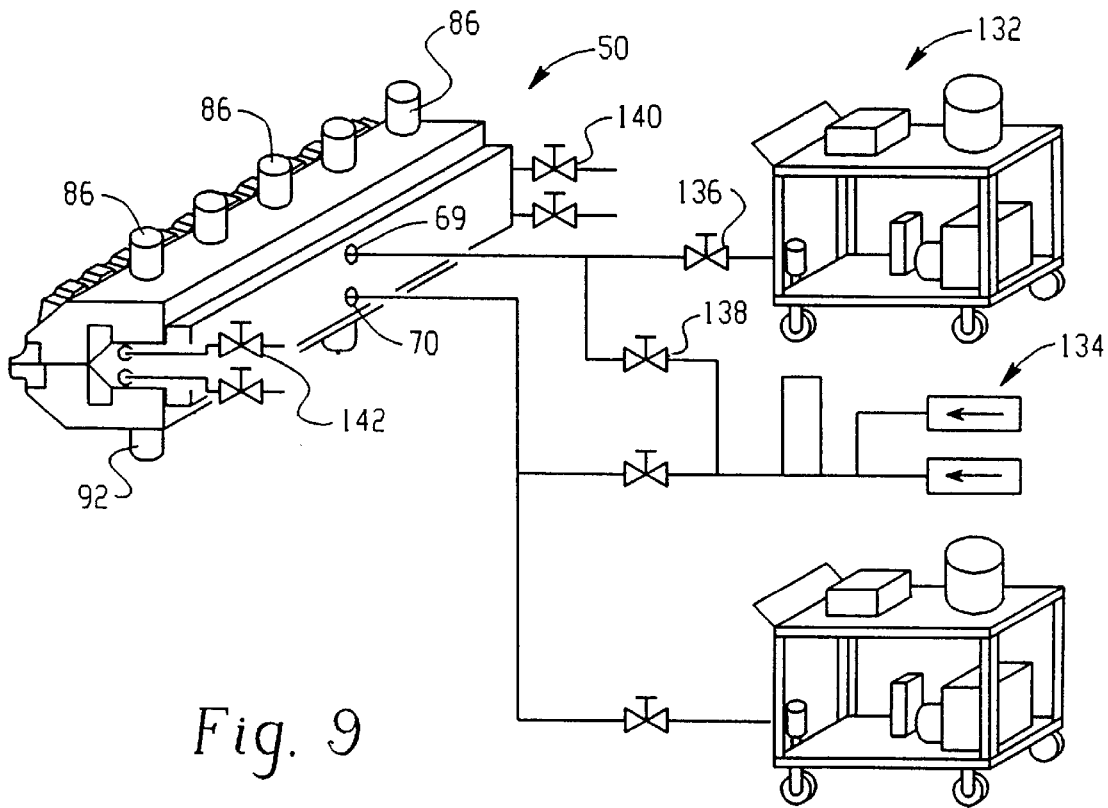
FIG. 9 is a schematic illustration of a coating system comprising the improved applicator die of the present invention and various peripherals.

FIG. 9 illustrates a preferred embodiment of the present invention in which inventive applicator die 50 is provided with a cleaning system for cleaning manifolds 72 and 74 as well as an automatic control system for controlling the operation of the switch die and the cleaning system. As shown in this figure, first inlet orifice 69 of die 50 is connected by suitable piping to a source 132 of a first liquid coating material and a source 134 of cleaning liquid. Control valves 136 and 138 connected to an automatic controller (not shown), are provided to allow and prevent flow of first liquid coating material and cleaning liquid into inlet orifice 69 as desired.

The outside ends of manifold 72 in the applicator die 50 shown in FIG. 9 are provided with outlet orifices which are connected by suitable piping to waste discharge ports (not shown), control valves 140 and 142 being provided to allow and prevent flow of fluid in manifold 72 out of these exit ports, as desired.

As illustrated in FIG. 9, second inlet orifice 70 is connected to a similar assembly for supplying a second coating liquid and cleaning liquid to manifold 74.

In operation, the automatic control system causes first actuators 86 of applicator die 50 to open switch bar 80 as well as control valve 136 to enable first liquid coating material from source 132 to flow into and through die 50 in the manner described above. When changeover to the second coating liquid is desired, the automatic control system causes first actuators 86 to move switch bar 80 so as to close first liquid passageway 76. Simultaneously, the automatic control system causes second actuators 92 to move switch bar 84 to open second liquid passageway 82. At essentially the same time, control valve 136 is closed to stop flow of first coating liquid into die 50, and the flow of the second coating liquid into die 50 is started by opening the corresponding control valve attached to the source of second coating liquid.

At essentially the same time, the cleaning system of the inventive apparatus is actuated to remove liquid coating material from manifold 72. This is accomplished by the automatic control system opening control valves 138, 140 and 142. As a result, cleaning solution from source 134 flows into manifold 72 from first inlet orifice 69 and then out of manifold 72 from the two exit ports located at its outer ends. After a suitable period of time, flow of the cleaning solution is terminated by the automatic control system closing control valves 138, 140 and 142 to complete the cleaning operation. When it is desired to switch the operation of applicator die back to the first coating liquid, the above operation is conducted in reverse, with manifold 74 then being cleaned while manifold 72 is in an operating mode for supplying first coating liquid to the web being coated.

A particular advantage of the inventive applicator die equipped with a cleaning system as illustrated in FIG. 9 is that a much greater degree of flexibility is possible than with earlier systems. This is because a third coating liquid, different from the first and second, can be introduced into the non-operating channel of the die after it has been cleaned and while the other channel of the die is still operating. Thus it will be appreciated that the inventive applicator die, when equipped with a cleaning system such as illustrated in FIG. 9, can process three, four, or in fact an unlimited number of different coating materials without shut down between successive coating runs.

Although only a few embodiments of the present invention have been described above, it should be appreciated that many modifications can be made without departing from the spirit and scope of the present invention. For example, the inventive applicator die can be provided with a heating element and/or channels for receipt and flow of a thermal transfer fluid as well as an associated temperature control system to control the temperature of the liquid coating materials being processed in the die. In addition, the control system of the die can be set up to move switch bars 80 and 82 at slightly different times, during each changeover, as this may have a beneficial effect or performance in certain instances. Also, the control system can be set up to allow both switch bars to be open or both closed at the same time. This would not only allow multiple layers of liquid coatings to be applied simultaneously, but also faciliate cleaning and flushing of the die. All such modifications are intended to be included within the scope of the present invention, which is to be limited only by the following claims:

We claim:

1. A die for alternately depositing first and second liquid materials on the surface of a moving web to form a coating layer thereon, said die comprising a die body defining an elongated coating orifice, first and second liquid passageways communicating with said coating orifice, first and second inlet orifices communicating with said first and second liquid passageways, respectively, and closure means for alternately opening and closing said first and second liquid passageways, said closure means being adapted to:

(a) define a closed passage from said first inlet orifice to said coating orifice when said second liquid passageway is closed, whereby said first liquid material can flow from said first inlet orifice through said coating orifice but is prevented from entering said second liquid passageway, and said second liquid material is prevented from flowing through said coating orifice or entering said first liquid passageway; and (b) define a closed passage from said second inlet orifice to said coating orifice when said first liquid passageway is closed, whereby said second liquid material can flow from said second inlet orifice through said coating orifice but is prevented from entering said first liquid passageway, and said first liquid material is prevented from flowing through said coating orifice or entering said second liquid passageway;

whereby the supply of liquid to said coating orifice is switched rapidly and positively from said first liquid material to said second liquid material and from said second liquid material to said first liquid material, and leakage of said first liquid material and second liquid material into one another is prevented.

2. The die of claim 1, wherein said coating orifice comprises an elongated slot, the closure means comprises a first closure element for closing said first liquid passageway and a second closure element for closing said second liquid passageway, and each of said first and second liquid passageways comprise elongated slots, each slot being defined by two congruent surfaces, one of said surfaces being defined by said die body and the other of said congruent surfaces being defined by a respective closure element, said congruent surfaces being adapted to matingly engage one another when the respective closure element is in its closed position whereby substantially all liquid is squeezed out of each liquid passageway when the respective closure element moves from its open position to its closed position.

3. The die of claim 1 wherein said first and second inlet orifices communicate with first and second manifolds, respectively, and said first and second manifolds communicate with said first and second liquid passageways, respectively.

4. The die of claim 1, wherein said die body is composed of a top section, a bottom section and a center section, said first liquid passageway passing between said first closure element and said center section and said second liquid passageway passing between said bottom section and said center section.

5. The die of claim 3, wherein each manifold is closely adjacent its respective liquid passageway.

6. The die of claim 1, wherein said die further defines a land communicating between said coating orifice and said first and second liquid passageways.

7. The die of claim 2, wherein said die further comprises an actuator for automatically snapping said closure elements between open and closed positions.

8. The die of claim 7, wherein said actuator includes a piston rod operatively connected to said closure means and a force generator for generating a force on said piston rod for snapping said closure elements between open and closed positions.

9. The die of claim 7, wherein said die further includes a control system for causing said actuator to actuate said closure means.

10. The die of claim 3, wherein said die further includes a cleaning system for cleaning said first manifold when said first liquid passageway is closed and for cleaning said second manifold when said second liquid passageway is closed.

11. The die of claim 10, wherein said cleaning system further includes charging means for charging a cleaning liquid into said first and second manifolds.

12. The die of claim 11, wherein said control means is adapted to control the flow of liquid material and cleaning liquid into each of said manifolds.

13. The die of claim 12, wherein said control means is adapted to stop the flow of liquid material into each manifold and to start the flow of cleaning liquid into each manifold when the respective flow passageway associated with that manifold is closed.

14. The die of claim 2, wherein each of said closure elements is slidably movable in said die body, each closure element including sealing means on at least one slidable surface thereof for preventing said first and second liquid materials from leaking out of said die.

15. The die of claim 14, said coating orifice comprises an elongated slot and said closure elements comprise switch bars; said coating orifice and each of said switch bars extend in a longitudinal direction transverse to the direction of travel of said web; all of such directions are substantially parallel to each other; and the width of said switch bars is substantially the same as the width of said coating orifice.

16. The die of claim 15, wherein said sealing means traverses the length of said switch bar.

17. The die of claim 14, wherein said sealing means includes a primary seal composed of at least one strip of compressible material.

18. The die of claim 3, further comprising a cleaning system for cleaning said first manifold when said first liquid passageway is closed and for cleaning said second manifold when said second liquid passageway is closed.

19. The die of claim 18, wherein said cleaning system further includes charging means for charging a cleaning liquid into said first and second manifolds.

20. The die of claim 19, wherein said cleaning system further includes control means for controlling the flow of liquid material and cleaning liquid into each of said manifolds.

21. The die of claim 20, wherein said control means is adapted to stop the flow of liquid material into each manifold and to start the flow of cleaning liquid into each manifold when the respective flow passageway associated with that manifold is closed.

22. The die of claim 21, wherein said cleaning system includes inlet and outlet cleaning orifices in communication with each of said manifolds, the inlet and outlet cleaning orifices in communication with each manifold allowing that manifold to be cleaned by charging a cleaning liquid into said inlet cleaning orifice and discharging said cleaning solution through said outlet cleaning orifice.

23. The die of claim 22, wherein said die body defines two outlet cleaning orifices and one inlet cleaning orifice communicating with each of said manifolds, the inlet orifice communicating with each manifold being located between the outlet orifices communicating with that manifold.

24. The die of claim 23, wherein each of said manifolds is substantially parallel to said elongated coating orifice, the length of each manifold being substantially as long as said elongated coating orifice or longer.

25. The die of claim 3 wherein said coating orifice comprises an elongated slot; said coating orifice, each of said manifolds and each of said liquid passageways extend in a longitudinal direction transverse to the direction of travel of said web; all of such directions are substantially parallel to each other; and each of said manifolds and each of said liquid orifices are substantially as wide as said coating orifice in said longitudinal directions.

* * * * *